(12) United States Patent
Gong

(10) Patent No.: US 6,301,491 B1
(45) Date of Patent: Oct. 9, 2001

(54) DEVICE AND METHOD FOR RADIO TERMINAL WITH HANDS-FREE FUNCTION

(75) Inventor: Sung-Hwa Gong, Kyongsangbuk-do (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/330,508

(22) Filed: Jun. 11, 1999

(30) Foreign Application Priority Data

Dec. 6, 1998 (KR) .................................................. 98-21902

(51) Int. Cl.[7] .............................. H04Q 7/32; H04Q 7/20
(52) U.S. Cl. ....................... 455/569; 455/566; 455/550; 455/575; 455/90; 455/345; 455/346; 379/420.01; 379/449; 379/433
(58) Field of Search ............................ 379/420, 420.01, 379/420.02, 420.04, 420.03, 449, 433, 428, 454, 455; 455/569, 566, 550, 575, 90, 345, 346, 351

(56) References Cited

U.S. PATENT DOCUMENTS

| | | | |
|---|---|---|---|
| 4,930,156 | * | 5/1990 | Norris .............................. 379/420.01 |
| 5,487,182 | * | 1/1996 | Hansson ................................ 455/569 |
| 6,081,724 | * | 6/2000 | Wilson .................................. 455/569 |
| 6,122,369 | * | 9/2000 | Hwang et al. ......................... 455/575 |
| 6,131,042 | * | 10/2000 | Lee et al. .............................. 455/345 |
| 6,134,456 | * | 10/2000 | Chen .................................... 455/345 |

* cited by examiner

Primary Examiner—William Trost
Assistant Examiner—Keith Ferguson
(74) Attorney, Agent, or Firm—Dilworth & Barrese, LLP

(57) ABSTRACT

A hands-free device and method are provided for implementing a hands-free function to a radio terminal. The hands-free device includes an amplifier for amplifying voice signals received from a microphone; a switching unit for switching the amplified voice signals to a speaker or to an earphone terminal; a controller for controlling the amplifier to amplify the voice signals received from the microphone by a predetermined value and for controlling the switching unit to output the amplified voice signals via the earphone terminal if the controller determines that the hands-free function has been selected; and an external voice output unit having an input terminal connected to the earphone terminal for receiving the amplified voice signals and a voice output speaker for outputting the amplified voice signals. The method for implementing a hands-free function to the radio terminal includes the steps of checking whether the hands-free function has been selected; controlling the switching unit to switch the amplified voice signals to the earphone terminal if the hands-free function has been selected; and outputting the amplified voice signals through the earphone terminal. The method further includes the steps of receiving voice signals through the microphone; and controlling the amplifier to amplify the voice signals received through the microphone by a predetermined value.

18 Claims, 2 Drawing Sheets

DEVICE AND METHOD FOR RADIO TERMINAL WITH HANDS-FREE FUNCTION

PRIORITY

This application claims priority to an application filed in the Korean Industrial Property Office entitled "Device and Method For Radio Terminal With Handsfree Function" on Jun. 12, 1998 and assigned Ser. No. 21902/1998, the contents of which are incorporated herein by reference.

BACKGROUND OF THE INVENTION

1. Technical Field

The present invention relates generally to a radio terminal and in particular, to a hands-free device for a radio terminal and method for implementing a hands-free function to the radio terminal.

2. Description of the Related Art

In order to implement a hands-free function to a radio terminal, a hands-free device is required. The hands-free device is generally more expensive than the radio terminal, due to competition among manufacturers of radio terminals. Therefore, if a user desires to implement a hands-free function to the radio terminal, a cost is incurred in purchasing a conventional hands-free device.

Accordingly, a need exists for a device and method for implementing a hands-free function to a radio terminal which is manageable and inexpensive.

SUMMARY

According to a preferred embodiment of the present invention, a hands-free device and method are provided for implementing a hands-free function to a radio terminal. The hands-free device includes an amplifier for amplifying voice signals received from a microphone; a switching unit for switching the amplified voice signals to a speaker or to an earphone terminal; a controller for controlling the amplifier to amplify the voice signals received from the microphone by a predetermined value and for controlling the switching unit to output the amplified voice signals via the earphone terminal if the controller determines that the hands-free function has been selected; and an external voice output unit having an input terminal connected to the earphone terminal for receiving the amplified voice signals and a voice output speaker for outputting the amplified voice signals.

The method for implementing a hands-free function to the radio terminal includes the steps of checking whether the hands-free function has been selected; controlling the switching unit to switch the amplified voice signals to the earphone terminal if the hands-free function has been selected; and outputting the amplified voice signals through the earphone terminal. The method further includes the steps of receiving voice signals through the microphone; and controlling the amplifier to amplify the voice signals received through the microphone by a predetermined value.

DETAILED DESCRIPTION OF PREFERRED EMBODIMENTS

Figure 1A:
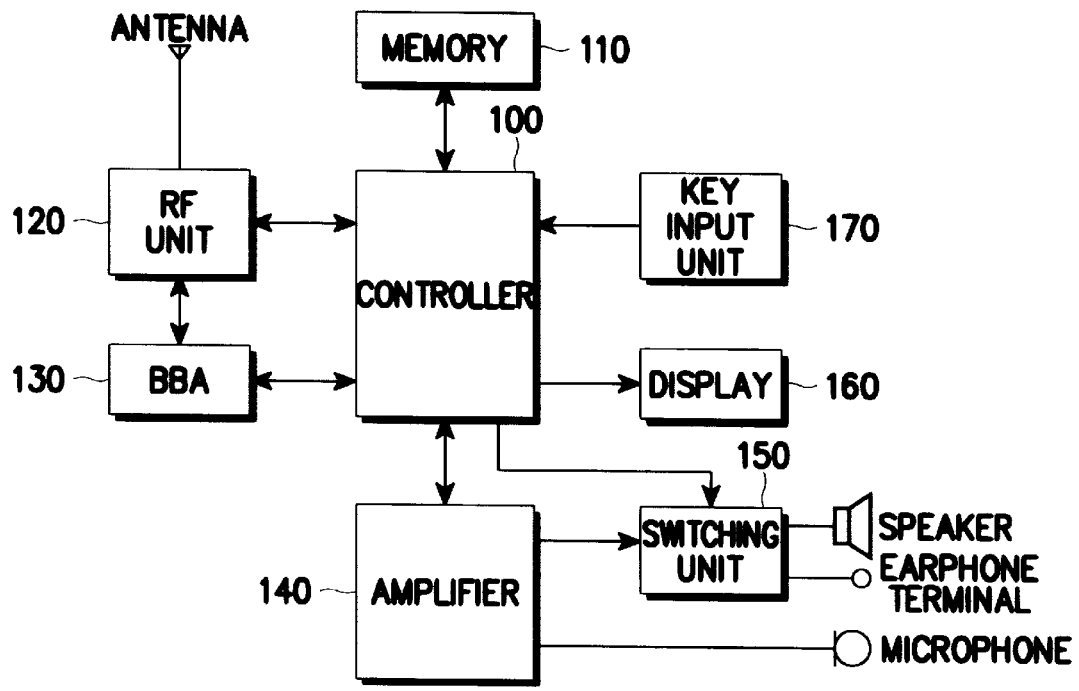
FIG. 1A is a block diagram of a hands-free device for implementing a hands-free function to a radio terminal according to a preferred embodiment of the present invention.

It is to be understood that in the following description of a preferred embodiment, specific details are set forth to provide a more thorough understanding of the present invention, notwithstanding that one skilled in the art may practice the invention without these specific details. It is to be further understood that in the accompanying drawings, similar reference numerals are used to denote elements having similar or equivalent constructions. In the following description, well known functions or constructions may not be described in detail since they would obscure the invention in unnecessary detail.

Figure 1B:
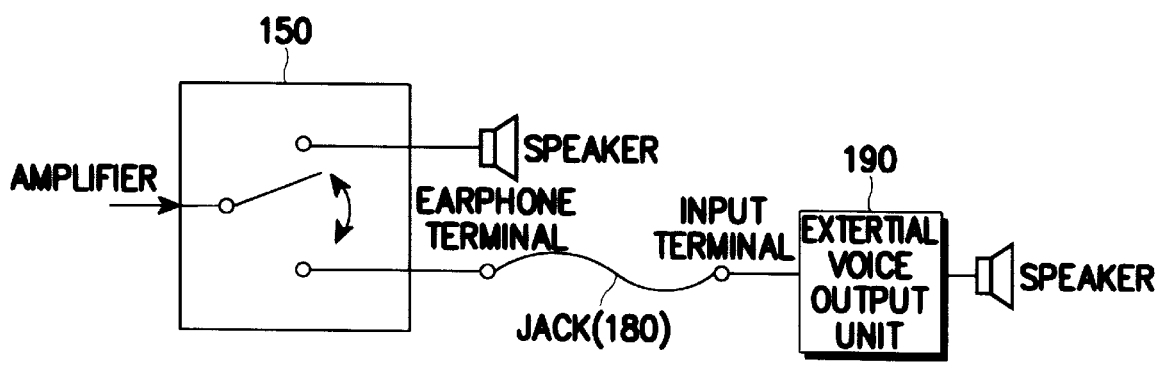
FIG. 1B is a block diagram illustrating an external voice output unit of the hands-free device of FIG. 1A.

With reference to FIG. 1A, there is shown a block diagram of a hands-free device for implementing a hands-free function to a radio terminal according to a preferred embodiment of the present invention. FIG. 1B is a block diagram illustrating an external voice output unit of the hands-free device of FIG. 1A. It is contemplated that the components illustrated by FIG. 1A, other than the antenna, are housed within a housing of the radio terminal, such as a phone body.

The radio terminal in accordance with the present invention is a mobile station modem (MSM) having, for example, an Intel 80186 CPU as a core processing element and provided in a CDMA(Code Division Multiple Access) PCS (personal communication system). The MSM is made of 176 pins and includes a memory 110 integrated from memories within a CPU and/or RAM, ROM and EEPROM memories external to the CPU. The MSM controls the entire operation of the radio terminal in response to a clock signal from BBA(base band analog). The ROM stores programs for controlling the radio terminal and the RAM stores flag information, call processing data, timer data, etc. The EEPROM stores a power level, a volume level, names and telephone numbers.

A controller 100 controls the general operation of an RF unit 120, the BBA (Base Band Analog) 130, a display 160, and a key input unit 170. The RF unit 120 receives/transmits signals via the antenna and includes the following units: a power amplifier, a driving amplifier, an up/down converter, a buffer, a TX/RX IF AGC (automatic gain control) amplifier, an RF BPF (radio frequency band pass filter) and an IF SAW BPF. The power amplifier amplifies signals to transmit the amplified signals to a base station via the antenna. The drive amplifier provides the power amplifier with signals to effectively perform the amplification. The up/down converter shifts up/down the frequencies output upon transmission/reception. The buffer of the RF unit 120 functions as an amplifier for inputting the signal to a local input terminal of the up-converter in the state of being phase-locked between a VCO (Voltage Controlled Oscillator) and PLL (Phase Lock Loop). The RF unit 120 further includes a duplexer for changing the operation of RF unit 120 according to the transmission/reception and a thermistor for compensating variations due to temperature.

The BBA 130 performs its operation between a signal processing procedure of the RF unit 120 and a digital processing procedure of the controller 100. That is, the BBA is positioned at the center of the signal processing between the RF unit 120 and the controller 100 and is directly connected to the controller 100. Intermediate frequency signals received through the RF unit 120 are amplified by the IF AGC AMP of the RF unit 120, filtered by the RF BPF of the RF unit 120 and converted into digital signals to be transmitted to the controller 100.

During a transmission procedure, a signal input via a microphone is converted into a digital signal by the controller 100. The digital signal is converted into an analog signal by the BBA 130 and then, the analog signal is converted into an intermediate frequency signal after filtering. The signal is then transmitted through the RF unit 120 and the antenna. The BBA 130 includes an ADC (analog/digital converter), a DAC (digital/analog converter), and a LPF (low pass filter). A displaying unit such as a LCD (liquid crystal display) can be used for a display 160 for displaying the state of the radio terminal and the progressing state of a program being executed by the controller 100.

The key input unit 170 has a plurality of digit keys and function keys for performing various functions. The key input unit 170 outputs data to the controller 100 based on the keys depressed. The amplifier 140 amplifies a voice signal inputted through the microphone. The switching unit 150 switches the voice signal outputted from the amplifier 140 to an earphone terminal or a speaker, as shown by FIG. 1B, depending on whether the hands-free function has been selected via the key input unit 170. The earphone terminal is connected to an external voice output unit 190 via a jack 180. The earphone terminal is a conventional earphone terminal. It is contemplated that the earphone terminal can be a mono jack and internal, i.e., housed within the housing or phone body of the radio terminal.

Figure 2:
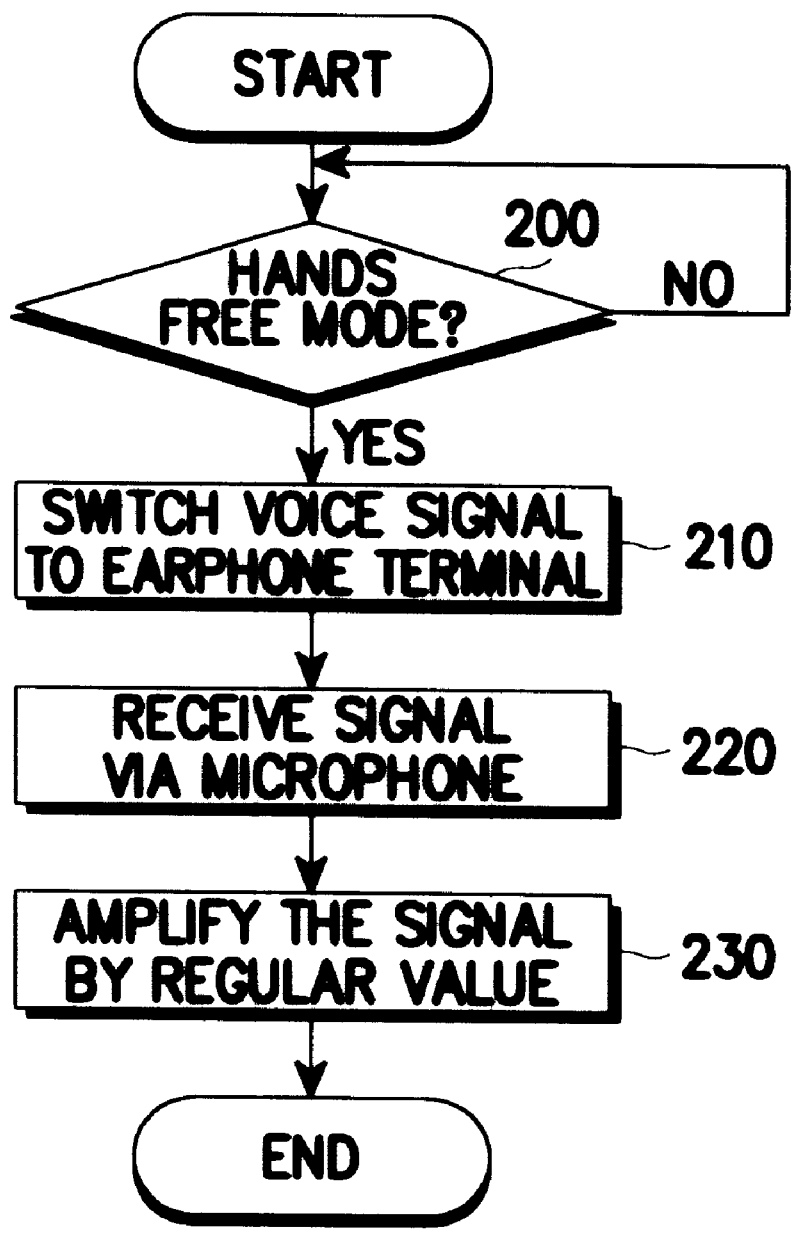
FIG. 2 is a flow chart illustrating a method of implementing a hands-free function to a radio terminal using the hands-free device of the present invention.

With reference to FIG. 2, there is shown a flow chart for implementing a hands-free function according to a preferred method of the present invention. First, after forming a speech path, at step 200, the controller 100 checks to determine whether the hands-free mode or function has been selected by depression of a corresponding key on the key input unit 170. If the hands-free mode has been selected, the controller proceeds to step 210. If the hands-free mode has not been selected, an iterative loop ensues and the controller keeps checking to determine whether the hands-free mode has been selected.

At step 210, the controller 100 controls the switching unit 150 to switch an output signal from the amplifier 140 to the earphone terminal. Then, the signal is applied to the voice output speaker through the external voice output unit 190 after being transmitted from the earphone terminal and the jack 180. It is contemplated that the external voice output unit 190 can be embodied using a general audio unit or a car audio unit mounted to a vehicle.

At step 220, the controller 100 receives a voice signal from the microphone and transmits the signal to the RF unit 120. Since the distance from the microphone to the RF unit 120 is greater in the inventive radio terminal than a conventional radio terminal, a small signal is inputted to the radio terminal. Therefore, owing to the input of the small signal, a called party cannot clearly understand the contents of communication sent by the calling party. To alleviate this problem, according to the present invention, at step 230, the inputted voice signal to the inventive radio terminal is amplified by a predetermined or regular value, unlike the conventional radio terminal. Such an automatic gain amplification method is disclosed in Korean Patent Application Nos. 1995/20350 filed on Jul. 11, 1995; 1996/11953 filed on Apr. 19, 1996; and 1996/39867 filed on Sep. 13, 1996.

While in the preferred embodiment of the present invention, a CDMA (Code Division Multiple Access) radio terminal is disclosed, it is understood that the present invention can be also applied to any communication device, such as a radio communication equipment, a satellite communication device, a PCS (Personal Communication System) terminal, a GSM (Global System for Mobile) terminal, and a WLL (Wireless Local Loop) terminal.

Additionally, instead of using the external voice output unit 190, it is contemplated that any audible device can be used which includes an input terminal and a speaker, such as a conventional audio device for home, a car audio mounted to a vehicle, and a cassette or compact disc player.

While the invention has been shown and described with reference to a certain preferred embodiment thereof, it will be understood by those skilled in the art that various changes in form and detail may be made therein without departing from the spirit and scope of the invention as defined by the appended claims.

What is claimed is:

1. A hands-free device for implementing a hands-free function to a radio terminal, the hands-free device comprising:

an amplifier for amplifying voice signals received from a microphone;

a switching unit for switching the amplified voice signals between a speaker unit and an earphone terminal;

a controller for controlling the amplifier to amplify the voice signals received from the microphone by a predetermined value and for controlling the switching unit to output the amplified voice signals to the earphone terminal if the controller determines that the hands-free function has been selected; and a voice output unit having an input terminal connected to the earphone terminal for receiving the amplified voice signals and a voice output speaker for outputting the amplified voice signals.

2. The hands-free device according to claim 1, further comprising a jack for connecting the earphone terminal to the input terminal of the voice output unit.

3. The hands-free device according to claim 1, wherein the amplifier, the switching unit, and the controller are housed within a housing of the radio terminal.

4. The hands-free device according to claim 3, wherein the voice output unit is external to said housing.

5. The hands-free device according to claim 1, wherein the amplifier further amplifies voice signals received from an antenna.

6. The hands-free device according to claim 1, wherein the voice output unit is a car audio unit having a speaker and mounted to a vehicle.

7. The hands-free device according to claim 1, wherein the hands-free function is selected by pressing a key on a key input unit connected to the controller.

8. The hands-free device according to claim 1, wherein the controller is connected to a memory unit and a display.

9. The hands-free device according to claim 1, further comprising a Base Band Analog (BBA) unit and a RF unit connected to each other and to the controller.

10. A hands-free device for implementing a hands-free function to a radio terminal, the hands-free device comprising:

an amplifier for amplifying voice signals received from a microphone;

switching means for switching the amplified voice signals between a speaker and an earphone terminal; and control means for controlling the amplifier to amplify the voice signals received from the microphone by a predetermined value and for controlling the switching unit to output the amplified voice signals to the earphone terminal if the control means determines that the hands-free function has been selected; and a voice output unit connected to the amplifier via an input terminal connected to the earphone terminal for receiving the amplified voice signals and a voice output speaker for outputting the amplified voice signals.

11. The hands-free device according to claim 10, wherein the amplifier, the switching means, and the control means are housed within a housing and the voice output unit is external to the housing.

12. A method for implementing a hands-free function to a radio terminal, the radio terminal including an amplifier for amplifying voice signals received from a microphone, a switching unit for switching the amplified voice signals between a speaker and an earphone terminal, and a voice output unit having an input terminal and a speaker for outputting the amplified voice signals, the method comprising the steps of:

checking whether the hands-free function has been selected;

controlling the switching unit to switch the amplified voice signals to the earphone terminal if the hands-free function has been selected; and outputting the amplified voice signals through the earphone terminal.

13. The method according to claim 12, further comprising the steps of:

receiving voice signals through the microphone; and controlling the amplifier to amplify the voice signals received through the microphone by a predetermined value.

14. A radio terminal of the type having an antenna, a key input unit, a display, and a transceiver for implementing wireless communications, the radio terminal comprising:

a housing; and means for implementing a hands-free function to the radio terminal comprising:

an amplifier for amplifying voice signals received from a microphone;

a switching unit for switching the amplified voice signals between a speaker unit and an earphone terminal;

a controller for controlling the amplifier to amplify the voice signals received from the microphone by a predetermined value and for controlling the switching unit to output the amplified voice signals to the earphone terminal if the controller determines that the hands-free function has been selected; and a voice output unit having an input terminal connected to the earphone terminal for receiving the amplified voice signals and a voice output speaker for outputting the amplified voice signals.

15. The radio terminal according to claim 14, wherein the means for implementing the hands-free function to the radio terminal further comprises a jack for connecting the earphone terminal to the input terminal of the voice output unit.

16. The radio terminal according to claim 14, wherein the amplifier further amplifies voice signals received from the antenna.

17. The radio terminal according to claim 14, wherein the hands-free function is selected by pressing a key on the key input unit connected to the controller.

18. The radio terminal according to claim 14, further comprising a Base Band Analog (BBA) unit and a RF unit connected to each other and to the controller.

\* \* \* \* \*